United States Patent
Pratt et al.

(10) Patent No.: US 10,447,781 B2
(45) Date of Patent: *Oct. 15, 2019

(54) POINT-TO-POINT DATA SYNCHRONIZATION

(71) Applicant: AT&T Intellectual Property I, L.P., Atlanta, GA (US)

(72) Inventors: James H. Pratt, Round Rock, TX (US); Garrett L. Stettler, Austin, TX (US); Marc Andrew Sullivan, Austin, TX (US)

(73) Assignee: AT&t Intellectual Property I, L.P., Atlanta, GA (US)

( * ) Notice: Subject to any disclaimer, the term of this patent is extended or adjusted under 35 U.S.C. 154(b) by 82 days.

This patent is subject to a terminal disclaimer.

(21) Appl. No.: 15/262,336

(22) Filed: Sep. 12, 2016

(65) Prior Publication Data
US 2017/0006100 A1    Jan. 5, 2017

Related U.S. Application Data

(63) Continuation of application No. 13/459,613, filed on Apr. 30, 2012, now Pat. No. 9,443,230.

(51) Int. Cl.
*H04L 29/08* (2006.01)
*H04L 12/24* (2006.01)
(Continued)

(52) U.S. Cl.
CPC ....... *H04L 67/1095* (2013.01); *G06Q 10/109* (2013.01); *H04B 7/0626* (2013.01);
(Continued)

(58) Field of Classification Search
CPC ..... H04L 51/38; H04L 51/14; H04L 67/1095; H04L 51/22; H04L 12/2859;
(Continued)

(56) References Cited

U.S. PATENT DOCUMENTS 7,483,925 B2    1/2009  Koskimies et al.
7,962,575 B2    6/2011  Glatt et al.
(Continued)

OTHER PUBLICATIONS

U.S. Office Action dated Jan. 2, 2014 in U.S. Appl. No. 13/459,613.
(Continued)

*Primary Examiner* — Abdullahi E Salad
(74) *Attorney, Agent, or Firm* — Hartman & Citrin LLC (57) ABSTRACT

Concepts and technologies for point-to-point data synchronization are provided. A personal area network connection between a first user device and a second user device is established. State change information of first data stored on the first user device is received by the second user device, and second data stored on the second device is updated to reflect the state change to synchronize the first data and the second data. Alternatively, a synchronization message including the state change information of first data stored on a first user device is received by the second user device. The state change information is extracted from the synchronization message, and second data stored on a second user device is updated to reflect the state change to synchronize the first data and the second data.

20 Claims, 7 Drawing Sheets

(51) Int. Cl.
*H04B 7/06* (2006.01)
*H04W 4/12* (2009.01)
*H04L 12/28* (2006.01)
*H04W 4/00* (2018.01)
*H04W 4/80* (2018.01)
*G06Q 10/10* (2012.01)
*H04L 12/58* (2006.01)
*H04W 88/02* (2009.01)

(52) U.S. Cl.
CPC ........ *H04L 12/2859* (2013.01); *H04L 41/026* (2013.01); *H04L 51/14* (2013.01); *H04L 51/38* (2013.01); *H04W 4/12* (2013.01); *H04W 4/80* (2018.02); *H04L 51/22* (2013.01); *H04W 88/02* (2013.01)

(58) Field of Classification Search
CPC ...... H04L 41/026; H04W 4/12; H04W 4/008; H04W 4/80; H04W 88/02; G06Q 10/109; H04B 7/0626
See application file for complete search history.

(56) References Cited

U.S. PATENT DOCUMENTS

| | | | |
|---|---|---|---|
| 8,010,158 B2 | 8/2011 | Parkkinen et al. | |
| 8,073,432 B2* | 12/2011 | Mahonen | G06F 17/30581 455/414.1 |
| 8,225,000 B2* | 7/2012 | Xu | H04L 67/1095 370/503 |
| 8,738,715 B2* | 5/2014 | Roy | G06Q 10/107 709/206 |
| 2004/0230662 A1 | 11/2004 | Estrada et al. | |
| 2006/0167949 A1* | 7/2006 | Berger | G06F 17/30067 |
| 2007/0076646 A1* | 4/2007 | Foster | H04L 12/1854 370/315 |
| 2007/0094334 A1* | 4/2007 | Hoffman | G06Q 10/107 709/206 |
| 2007/0260751 A1 | 11/2007 | Meesseman | |
| 2008/0242323 A1 | 10/2008 | Nair | |
| 2009/0106455 A1 | 4/2009 | Xu et al. | |
| 2009/0157799 A1* | 6/2009 | Sukumaran | G06Q 10/10 709/203 |
| 2009/0298468 A1* | 12/2009 | Hsu | H04W 12/12 455/411 |
| 2010/0100641 A1 | 4/2010 | Quinlan et al. | |
| 2010/0151891 A1 | 6/2010 | Coelho | |
| 2010/0179994 A1 | 7/2010 | Bittles et al. | |
| 2010/0185584 A1 | 7/2010 | Vendrow et al. | |
| 2010/0287307 A1 | 11/2010 | John | |
| 2010/0332682 A1* | 12/2010 | Sharp | G06Q 10/00 709/248 |
| 2011/0016194 A1* | 1/2011 | Von Haden | H04L 67/06 709/219 |
| 2011/0136516 A1 | 6/2011 | Ellis | |
| 2011/0165895 A1 | 7/2011 | Ryan | |
| 2011/0265895 A1* | 11/2011 | Okabe | C23C 16/00 137/561 A |
| 2012/0021727 A1 | 1/2012 | Kelly | |
| 2012/0031727 A1* | 2/2012 | Nett | F16H 57/0409 192/113.1 |
| 2012/0079368 A1* | 3/2012 | Abdelaziz | G06F 9/465 715/234 |
| 2013/0122811 A1 | 5/2013 | Scribano et al. | |
| 2013/0138786 A1 | 5/2013 | Ji et al. | |
| 2013/0281022 A1 | 10/2013 | Mahany et al. | |

OTHER PUBLICATIONS

U.S. Office Action dated Jun. 26, 2014 in U.S. Appl. No. 13/459,613.
U.S. Office Action dated Jan. 2, 2015 in U.S. Appl. No. 13/459,613.
U.S. Office Action dated Jun. 30, 2015 in U.S. Appl. No. 13/459,613.
U.S. Office Action dated Jan. 8, 2016 in U.S. Appl. No. 13/459,613.
U.S. Notice of Allowance dated Apr. 21, 2016 in U.S. Appl. No. 13/459,613.

* cited by examiner

POINT-TO-POINT DATA SYNCHRONIZATION

CROSS-REFERENCE TO RELATED APPLICATIONS

This application is a continuation of U.S. patent application Ser. No. 13/459,613, filed Apr. 30, 2012, now U.S. Pat. No. 9,443,230, which is incorporated herein by reference in its entirety.

TECHNICAL FIELD

The concepts and technologies disclosed herein generally relate to data synchronization. More particularly, the concepts and technologies disclosed herein relate to point-to-point data synchronization.

BACKGROUND

There has been a push in recent years to utilize data synchronization technologies to synchronize data stored on multiple disparate devices, such as computers and smartphones. Data synchronization technologies are sometimes used to provide messaging services through which short, often text-based messages can be shared among individuals. These services are provided as an alternative to short message service ("SMS") messaging and sometimes offer a monetary benefit in being cheaper for the end user than SMS. These services, however, rely on cloud-based synchronization technologies, which can dramatically increase network congestion and thereby increase costs to a network service provider. Cloud-based synchronization technologies also can introduce delays. These delays can result in messages being received out of order by a user's device and, as a result, may be displayed by the user's device in a disorganized or indiscernible manner.

Other cloud-based synchronization technologies, such as those commonly used for e-mail services, may introduce delays that result in data that is supposed to be synchronized actually being out-of-synchronization for a period of time. This can cause confusion and frustration for a user.

It is with respect to these and other considerations that the disclosure made herein is presented.

SUMMARY

Concepts and technologies are disclosed herein for point-to-point data synchronization. Point-to-point data synchronization is used to describe data synchronized between two devices. It should be understood, however, that point-to-point data synchronization is also intended to encompass point-to-multipoint data synchronization, wherein data is synchronized between three or more devices.

According to one aspect disclosed herein, a method for synchronizing first data stored on a first user device with second data stored on a second user device includes establishing a personal area network connection between the first user device and the second user device when the first user device and the second user device are within proximity and receiving, at the second user device via the personal area network connection, state change information associated with the first data. The state change information identifies a state change of the first data stored on the first device. The method also includes updating, at the second user device, the second data to reflect the state change to synchronize the first data and the second data.

In some embodiments, the first user device and the second user device are both associated with a single user. In other embodiments, the first user device is associated with a first user and the second user device is associated with a second user.

In some embodiments, the first data includes first message data and the second data includes second message data. In these embodiments, the first message data may include a message that is not included in the second message data. Also in these embodiments, the second message data is updated to include the message.

In some embodiments, first message data includes first e-mail message data, second message data includes second e-mail message data, and a message includes an e-mail message from an e-mail server that was received by the first user device but was not yet received by the second user device from an e-mail server prior to the personal area network connection being established between the first user device and the second user device.

In some embodiments, first message data includes first mobile message data, second message data includes second mobile message data, and a message includes a mobile message generated by the first user device directed to at least the second user device that was not yet received by the second user device from a mobile message service center serving the second user device prior to the personal area network connection being established between the first user device and the second user device. In these embodiments, the first user device may be configured to operate on a first wireless wide area network and the second user device may be configured to operate on a second wireless wide area network. In these embodiments, the state change information may include an order of the mobile message within a message flow that includes a plurality of mobile messages.

In some embodiments, first message data includes first e-mail message data, second message data includes second e-mail message data, and the state change information includes information regarding a deletion of or a reading of an e-mail message included in the first e-mail message data and the second e-email message data.

According to another aspect disclosed herein, a method for synchronizing first data stored on a first user device with second data stored on a second user device via a synchronization message includes receiving, at the second user device, the synchronization message including state change information identifying a state change of the first data stored on the first device, extracting, at the second user device, the state change information from the synchronization message, and updating, at the second user device, the second data to reflect the state change to synchronize the first data and the second data.

In some embodiments, the state change information includes an indication that the first data stored on the first device has changed in a particular manner, and updating the second data to reflect the state change to synchronize the first data and the second data includes changing the second data in the particular manner to synchronize the first data and the second data.

In some embodiments, the first data and the second data each include e-mail message data or mobile message data and the state change information includes an indication that at least a portion of the first data stored on the first device has been deleted. In these embodiments, updating, at the second user device, the second data to reflect the state change to synchronize the first data and the second data includes deleting at least the portion of the second data to synchronize the first data and the second data.

In some embodiments, the first data and the second data each include an e-mail message and the state change information includes an indication that the e-mail message stored on the first device has been read. In these embodiments, updating, at the second user device, the second data to reflect the state change to synchronize the first data and the second data includes updating the e-mail message stored on the second device as having been read to synchronize the first data and the second data.

In some embodiments, the synchronization message includes a hidden short message service message. In some embodiments, the synchronization message includes a visible short message service message. In any case, the state change information may be included in a payload of the short message service message or in a subject line of the short message service message.

According to another aspect disclosed herein, a user device includes a processor and a memory. The memory includes instructions stored thereupon that, when executed by the processor, cause the processor to receive state change information identifying a state change of a mobile message flow comprising a plurality of mobile messages received by the user device, and to update the mobile message flow to reflect the state change so that the mobile message flow is synchronized with another message flow resident on another user device.

In some embodiments, the user device also includes a display and the memory also includes instructions stored thereupon that, when executed by the processor, cause the processor to receive the plurality of mobile messages and present the plurality of mobile messages on the display in a first order in which the plurality of mobile messages are received. The first order may include a particular mobile message of the plurality of mobile messages being in an incorrect position within the mobile message flow because the particular mobile message was received out of order. In these embodiments, the user device may include a communications component configured to establish a personal area network connection between the user devices over which to receive the state change information. Alternatively, in these embodiments, the state change information may be received via a synchronization message.

It should be appreciated that the above-described subject matter may be implemented, for example, as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Concepts and technologies are disclosed herein for point-to-point data synchronization. Point-to-point data synchronization is used to describe data synchronized between two devices. It should be understood, however, that point-to-point data synchronization is also intended to encompass point-to-multipoint data synchronization, wherein data is synchronized between three or more devices. In the embodiments described herein, each point is a user device such as, but not limited to, a mobile device (e.g., a smartphone or other cellular telephone), a personal computer ("PC"), a desktop workstation, a laptop computer, a tablet computer, a notebook computer, an ultraportable computer, a personal digital assistant ("PDA"), an electronic-book reader, a game console, a set-top box, a consumer electronics device, a server computer, or any other type of computing system.

While the subject matter described herein may be presented, at times, in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, mobile devices, wireless devices, multiprocessor systems, microprocessor-based or programmable consumer electronics, minicomputers, mainframe computers, and the like.

In the following detailed description, references are made to the accompanying drawings that form a part hereof, and in which are shown by way of illustration specific embodiments or examples. Referring now to the drawings, in which like numerals represent like elements throughout the several figures, aspects of a computing system, computer-readable storage medium, and computer-implemented methodology for point-to-point data synchronization, among others, will be presented.

Figure 1:
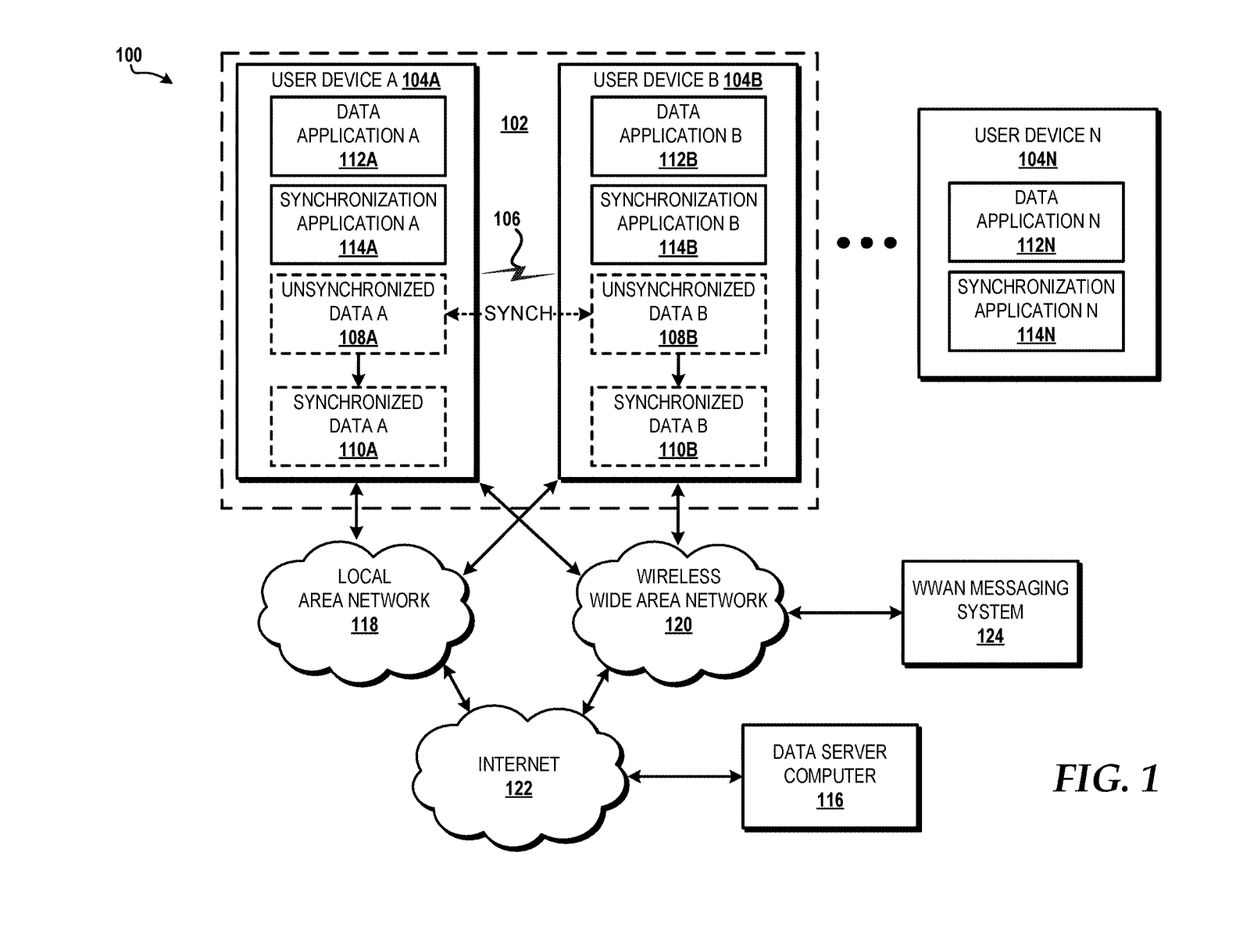
FIG. 1 is a diagram illustrating an illustrative operating environment for implementing various embodiments presented herein.

Referring now to FIG. 1, aspects of an operating environment 100 for various embodiments presented herein will be described. The illustrated operating environment 100 includes a personal area network ("PAN") 102 in which a first user device ("user device A") 104A and a second user device ("user device B") 104B are located. The PAN 102 is a network established between two or more devices that are in physical proximity using a network technology. In some instances, the PAN 102 requires the devices to be in physical contact at one or more points, which may include particular points at which physical contact must be present in order to establish the PAN 102. In some instances, the physical proximity is on the order of zero to a few centimeters or zero to a few meters. In some instances, the conditions of two or more devices being in physical proximity are governed by the network technology utilized to establish the PAN 102. The network technology, in some embodiments, is a wireless network technology such as, but not limited to, infrared data association ("IrDA"), BLUETOOTH, wireless universal serial bus ("USB"), Z-WAVE, ZIGBEE, near-field communications ("NFC"), or ad-hoc WI-FI. In these embodiments, the PAN 102 is a wireless PAN ("WPAN"). Wired network technologies for establishing the PAN 102 are also contemplated.

The PAN 102 allows the user device A 104A and the user device B 104B to communicate via a PAN connection 106 to synchronize unsynchronized data 108A stored on the user device A 104A and unsynchronized data 108B on the user device B 104B to create synchronized data A 110A and synchronized data B 110B on the user device A 104A and the user device B 104B, respectively. In doing so, the user device A 104A and the user device B 104B need not rely upon synchronization mechanisms, such as cloud synchronization, which often causes undesirable delays and cost valuable data network resources.

The unsynchronized data A 108A, the unsynchronized data B 108B, the synchronized data A 110A, and the synchronized data B 110B, at times, may be referred to herein generally as "data." The data stored on the user device A 104A and the user device B 104A may be any type of data that is capable of being shared among two or more devices. In the illustrated embodiment, the user device A 104A and the user device B 104B share data and may additionally share that data with any number of other devices, represented as user device N 104N.

In some embodiments, the data includes message data associated with one or more messages exchanged between devices. The message data may include mobile message data such as short message service ("SMS") message data or multimedia message service ("MMS") message data, which may include group mobile messaging data. Alternatively, the message data may include, but is not limited to, including, chat message data, asynchronous voice chat message data, e-mail message data, or some combination thereof. The message data, in some embodiments, includes message content such as, but not limited to, one or more letters, numbers, symbols, images, videos, music files, audio files, and/or locations (e.g., address or latitude-longitude). The message data, in some embodiments, includes message context information such as, but not limited to, time, message status, media playback position, media playback status (e.g., media being or not being played), and/or context provided by some message content. In some embodiments, the data includes service information that is associated with one or more services utilized by a user device. For instance, a location-based service, such as a mapping service, may have map data, location data, and other related information associated therewith. Likewise, for instance, a social networking service may have social networking data, such as status updates, friend's lists, liked persons, places, or things, and/or other related information.

The user device A 104A, the user device B 104B, and the user device N 104N each may be a mobile device (e.g., a smartphone or other cellular telephone), a PC, a desktop workstation, a laptop computer, a tablet computer, a notebook computer, an ultraportable computer, a PDA, an electronic-book reader, a game console, a set-top box, a consumer electronics device, a server computer, or any other type of computing system configured to perform the various operations described herein. In the illustrated embodiment, the user device A 104A includes a data application A 112A and a synchronization application A 114A; the user device B 104B includes a data application B 112B and a synchronization application B 114B; and the user device N 104N includes a data application N 112N and a synchronization application N 114N.

Each of the data applications 112 is configured to execute on the respective user device 104 to receive data from and transmit data to one or more other devices. For instance, the data application A 112A may receive a message and present message content associated with the message via a display and/or speaker of the user device A 104A. The message content may be received locally at the user device A 104A through some input mechanism, such as a touchscreen, keyboard, or microphone, of the user device A 104A. The message content alternatively may be received from some external source, such as a data server computer 116, as will be described in greater detail below. In some embodiments, each of the data applications 112 is an SMS application, an MMS application, a chat application, an e-mail application, a map application, a location-based service application, or some combination thereof.

Each of the synchronization applications 114 is configured to execute on the respective user device 104 to synchronize the unsynchronized data 108 to create synchronized data 110 in accordance with various embodiments disclosed herein. In the illustrated embodiment, for instance, the user device A 104A executes the synchronization application A 114A to initiate the PAN connection 106 to the user device B 104B over which to synchronize the unsynchronized data A 108A and the unsynchronized data B 108B to create the synchronized data A 110A and the synchronized data B 110B on the respective user devices 104A, 104B. It should be understood that a synchronization process to synchronize unsynchronized data between two or more devices may include one-way or two-way communications via the PAN connection 106.

By way of example, and not limitation, suppose the unsynchronized data A 108A includes data associated with a message exchange between a user of the user device A 104A and another user of another user device (not shown), and suppose the message exchange includes a plurality of individual messages, one or more of which has been received by the user device A 104A. Now, also consider that the user of the user device A 104A is a user of the user device B 104B and the user device B 104 has received one or more of the plurality of messages out of order or not at all. Because the PAN connection 106 has been established and the synchronization application A 114A and the synchronization application B 114B are configured to maintain synchronization of data associated with the user device A 104A and the user device B 104B, respectively, the one or more messages that the user device B 104 has received out of order or not at all can be synchronized so that each of the plurality of messages is presented on the user device B 104B in the correct order. In some embodiments, after synchronization, a user device, such as the user device B 104B in the above example, may then receive a message that was not previously received. Since the synchronization applications 114 have successfully corrected the problem of the user device B 104B not receiving the message, the data application B 112B may disregard and, in some instances, automatically delete the message as already having been received.

Although the data applications 112 and the synchronization applications 114 are shown as separate applications, these applications may be combined. Moreover, although the data applications 112 and the synchronization applications 114 are shown as single applications, each of these applications may be representative of multiple applications.

The user device A 104A and the user device B 104B are each illustrated as being in communication with a local area network ("LAN") 118 and a wireless wide area network ("WWAN") 120. It should be understood, however, that the user device A 104A and/or the user device B 104B alternatively may be in communication with only one of these networks. The user device N 104N may be similarly connected. The LAN 118 and the WWAN 120 are each illustrated as being in communication with an internet 122, such as the Internet, which, in turn, is in communication with the data server computer 116. The WWAN 120 is also in communication with a WWAN messaging system 124.

The LAN 118 may be a wireless LAN ("WLAN") operating in accordance with one or more Institute of Electrical and Electronic Engineers ("IEEE") 802.11 standards, such as IEEE 802.11a, 802.11b, 802.11g, 802.11n, and/or future 802.11 standard (referred to herein collectively as WI-FI). Draft 802.11 standards are also contemplated. In some embodiments, the LAN 118 is implemented utilizing one or more wireless WI-FI access points. In some embodiments, one or more of the wireless WI-FI access points is another computing device that is functioning as a WI-FI hotspot. In some embodiments, the user device A 104A and/or the user device B 104B connect to the LAN 118 via one or more secure connections each of which may utilize an encryption technology such as, but not limited, WI-FI Protected Access ("WPA"), WPA2, Wired Equivalent Privacy ("WEP"), or the like. The LAN 118 may alternatively be a wired LAN operating in accordance with one or more wired networking standards such as, but not limited to, IEEE 802.3 ("Ethernet"). In these implementations, the LAN 118 may include any number of routers. In any case, the LAN 118 is in communication with the internet 122 so as to send and/or receive data from the data server computer 116.

The WWAN 120 may be a mobile telecommunications network utilizing one or more mobile telecommunications technologies to provide voice and/or data services to the user device A 104A and/or the user device B 104B. The mobile telecommunications technologies can include, but are not limited to, Global System for Mobile communications ("GSM"), Code Division Multiple Access ("CDMA") ONE, CDMA2000, Universal Mobile Telecommunications System ("UMTS"), Long Term Evolution ("LTE"), and Worldwide Interoperability for Microwave Access ("WiMAX"). Moreover, the WWAN 120 may utilize various channel access methods (which may or may not be used by the aforementioned standards) including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Space Division Multiple Access ("SDMA"), and the like. Data communications may be provided using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and various other current and future wireless data access standards. The WWAN 120 may be configured to provide voice and/or data communications with any combination of the above technologies. The WWAN 120 may be configured to or adapted to provide voice and/or data communications in accordance with future generation technologies. In any case, the LAN 118 is in communication with the internet 122 so as to send data to and/or received data from the data server computer 116.

The data server computer 116 is configured to receive data from one or more devices and provide that data via the internet 122 to the user device A 104A and/or the user device B 104B. In some embodiments, the data server computer 116 is or includes an e-mail server. In some embodiments, the data server computer 116 is or includes a social network service server. In some embodiments, the data server computer 116 is a location-based service computer. In some embodiments, the data server computer 116 is a media server computer that provides audio, video, and/or images. In some embodiments, the data server computer 116 is a mapping server. In some embodiments, the data server computer 116 is a Web server.

The data server computer 116 is configured to execute one or more modules (not shown) in order to provide various services described herein. The module(s) may execute on a single data server computer 116 as in the illustrated embodiment, or in parallel across multiple data server computers. In addition, each module may consist of a number of subcomponents executing on different data server computers or other computing systems or devices within, or in communication with, the data server computer 116. The modules may be implemented as software, hardware, or any combination thereof.

The WWAN messaging system 124 is configured to receive mobile message data from one or more devices and provide that data via the WWAN 120 to the user device A 104A and/or the user device B 104B. In some embodiments, the WWAN messaging system 124 is an SMS center ("SMSC") operated by or for the wireless service operator that operates the WWAN 120. In some embodiments, the WWAN messaging system 124 is an MMS center ("MMSC") operated by or for the wireless service operator that operates the WWAN 120.

Figure 2:
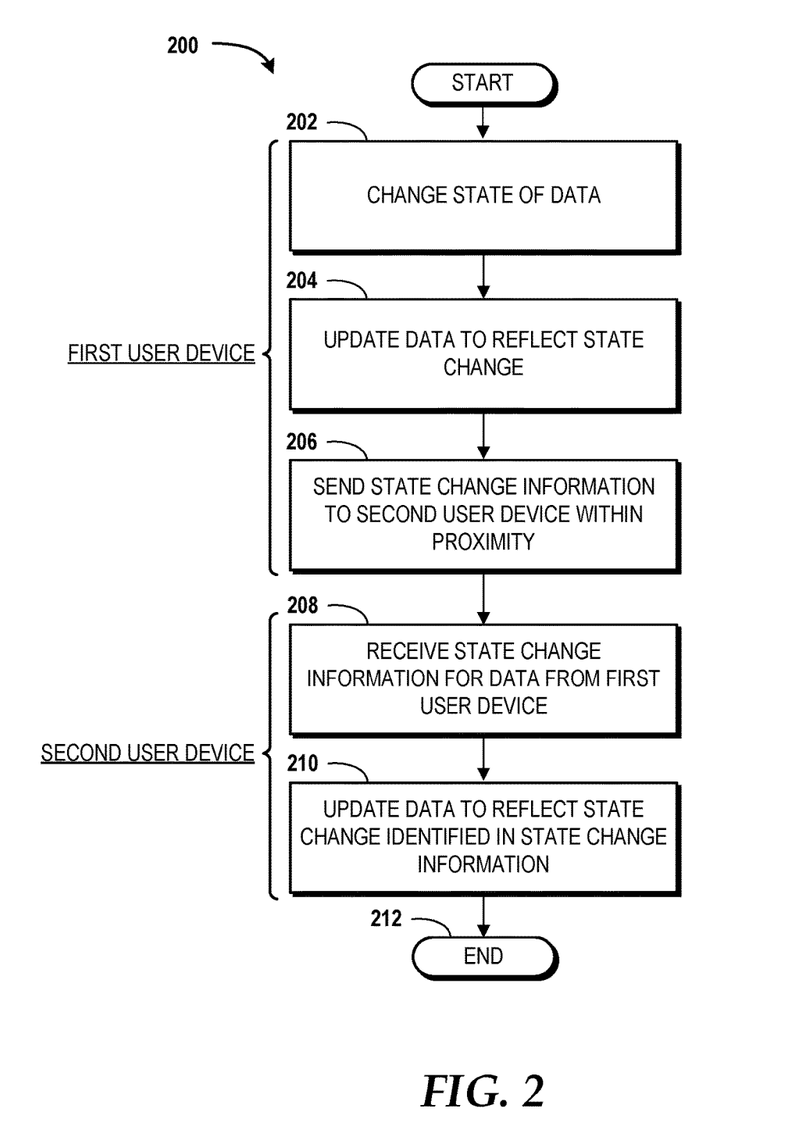
FIG. 2 is a flow diagram showing aspects of a method for synchronizing data within a personal area network ("PAN"), according to an illustrative embodiment.

Turning now to FIG. 2, a flow diagram showing aspects of a method 200 for synchronizing data (e.g., the unsynchronized data 108) within the PAN 102 will be described, according to an illustrative embodiment. The method 200 is described below also with reference to FIG. 1. Operations of the method 200 are described below as being performed by a first user device or a second user device. It should be understood that the same or similar methodology may be used to synchronize data among three or more devices. For purposes of explanation, the first user device is the user device A 104A and the second user device is the user device B 104B.

It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated methods can be ended at any time and need not be performed in their respective entireties. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, wireless devices, mobile devices, minicomputers, mainframe computers, personal computers, hand-held computing devices, processor-based, programmable consumer electronics, combinations thereof, and the like.

Thus, it should be appreciated that the logical operations described herein are implemented (1) as a sequence of computer-implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

The method 200 begins and proceeds to operation 202, wherein a first user device, such as the user device A 104A, changes the state of some data via the data application A 112A. In some embodiments, the state change is responsive to data received by the user device A 104A via an input mechanism. For instance, a user of the user device A 104A may input a new message for inclusion in a message exchange. In some embodiments, the state change is responsive to some data received by the user device A 104A from the data server computer 116 via the internet 122 or via the WWAN messaging system 124 via the WWAN 120. In any case, the method 200 proceeds to operation 204, wherein the user device A 104A updates the data to reflect the state change. In doing so, it is assumed that the data stored on the user device A 104A now constitutes unsynchronized data, such as the unsynchronized data A 108A. The data may be considered unsynchronized in part because it is in a state that is different from the state of data stored on a second user device, such as the user device B 104B.

From operation 204, the method 200 proceeds to operation 206, wherein the user device A 104A sends state change information to the user device B 104B that is within proximity to the user device A 104A via the PAN connection 106. The user device B 104B receives the state change information at operation 208. From operation 208, the method 200 proceeds to operation 210, wherein the user device B 104B updates the unsynchronized data 108B to reflect the state change identified in the state change information. The method 200 then proceeds to operation 212, wherein the method 200 ends.

In some embodiments, the user device A 104A and the user device B 104B are both associated with a single user. For example, the user device A 104A may be the user's smartphone and the user device B 104B may be the user's laptop computer. Alternatively, the user device A 104A is associated with a first user and the user device B 104B is associated with a second user.

In some embodiments, the unsynchronized data 108A includes first message data and the unsynchronized data 108B includes second message data. In these embodiments, the first message data may include a message that is not included in the second message data. Also in these embodiments, the second message data is updated to include the message at operation 208.

In some embodiments, first message data includes first e-mail message data, second message data includes second e-mail message data, and a message includes an e-mail message from the data server computer 116 operating as e-mail server that was received by the user device A 104A but was not yet received by the user device B 104B from the data server computer 116 prior to the PAN connection 106 being established between the user device A 104A and the user device B 104B.

In some embodiments, first message data includes first mobile message data, second message data includes second mobile message data, and a message includes a mobile message generated by the user device A 104A directed to at least the user device B 104B that was not yet received by the user device B 104B from the WWAN messaging system 124 operating as a mobile message service center, such as an SMSC or MMSC, serving the user device B 104B prior to the PAN connection 106 being established between the user device A 104A and the user device B 104B. In these embodiments, the user device A 104A may be configured to operate on a first wireless wide area network and the second user device may be configured to operate on a second wireless wide area network. In these embodiments, the state change information may include an order of the mobile message within a message flow that includes a plurality of mobile messages.

In some embodiments, first message data includes first e-mail message data, second message data includes second e-mail message data, and the state change information includes information regarding a deletion of or a reading of an e-mail message included in the first e-mail message data and the second e-email message data.

Figure 3:
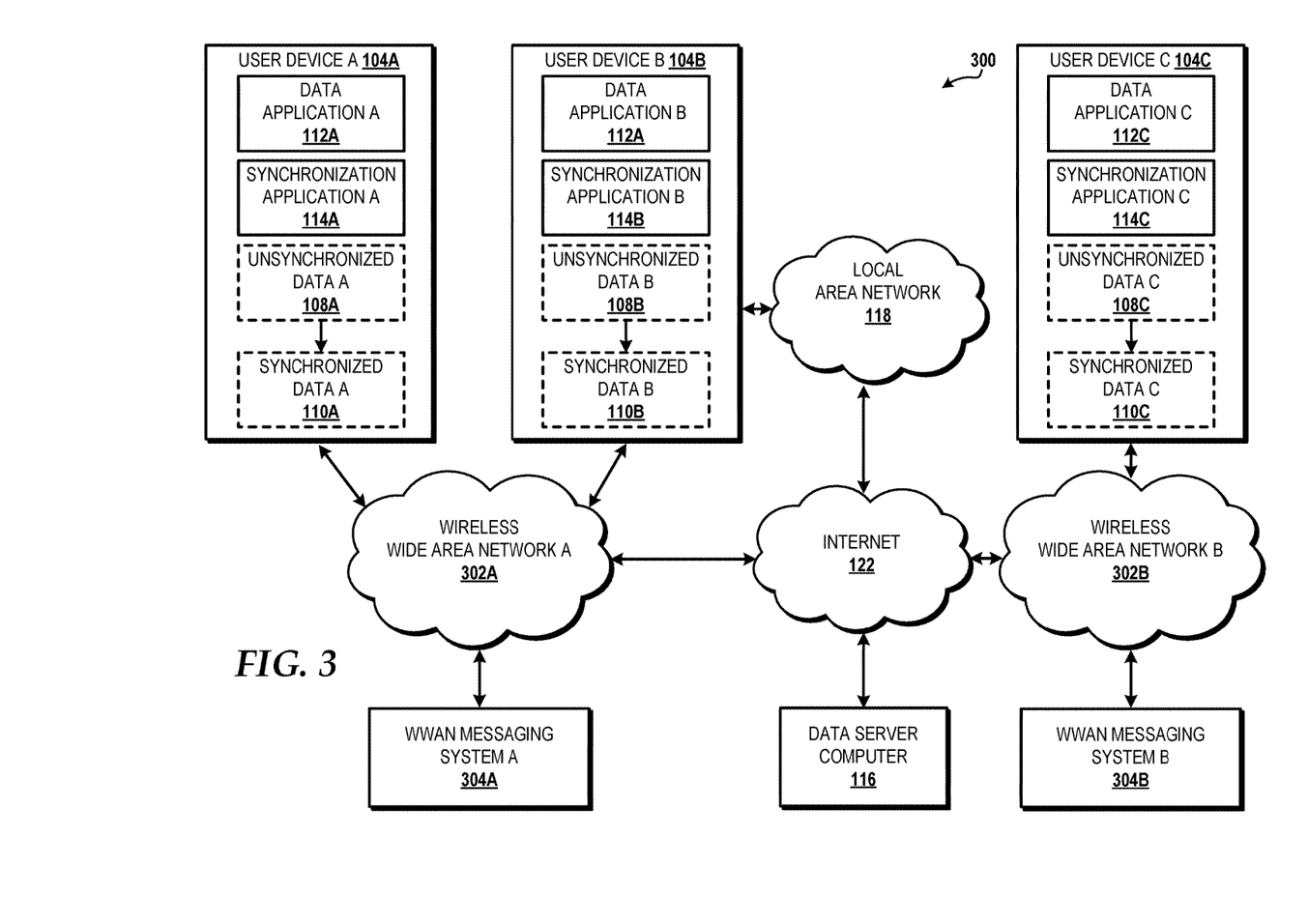
FIG. 3 is a diagram illustrating another illustrative operating environment for implementing various embodiments presented herein.

Turning now to FIG. 3, aspects of another operating environment 300 for various embodiments presented herein will be described. The operating environment 300 includes the user device A 104A, the user device B 104B, the data server computer 116, the LAN 118, and the internet 122. The user device A 104A and the user device B 104B are configured in the manner described herein above with reference to FIG. 1. Additionally, a third user device—user device C 104C—is shown configured in a similar manner with unsynchronized data C 108C, synchronized data C 110C, a data application C 112C, and a synchronization application C 114C.

In the illustrated embodiment, the user device A 104A and the user device B 104B are in communication with a WWAN A 302A, which, in turn, is in communication with a WWAN messaging system A 304A and the internet 122. The user device B 104B is also in communication with the LAN 118, which, in turn, is in communication with the data server computer 116 via the internet 122. The user device C 104C is in communication with a WWAN B 302B, which, in turn, is in communication with a WWAN messaging system B 304B and the internet 122. The WWAN A 302A and the WWAN B 302B may be configured like the WWAN 120 described herein above. It is contemplated that the WWAN A 302A and the WWAN B 302B may operate utilizing different wireless telecommunications technologies. The WWAN messaging system A 304A and the WWAN messaging system B 304B may be configured like the WWAN messaging system 124. It is contemplated that the WWAN messaging system A 304A and the WWAN messaging system B 304B may operate utilizing different mobile messaging service technologies.

Figure 4:
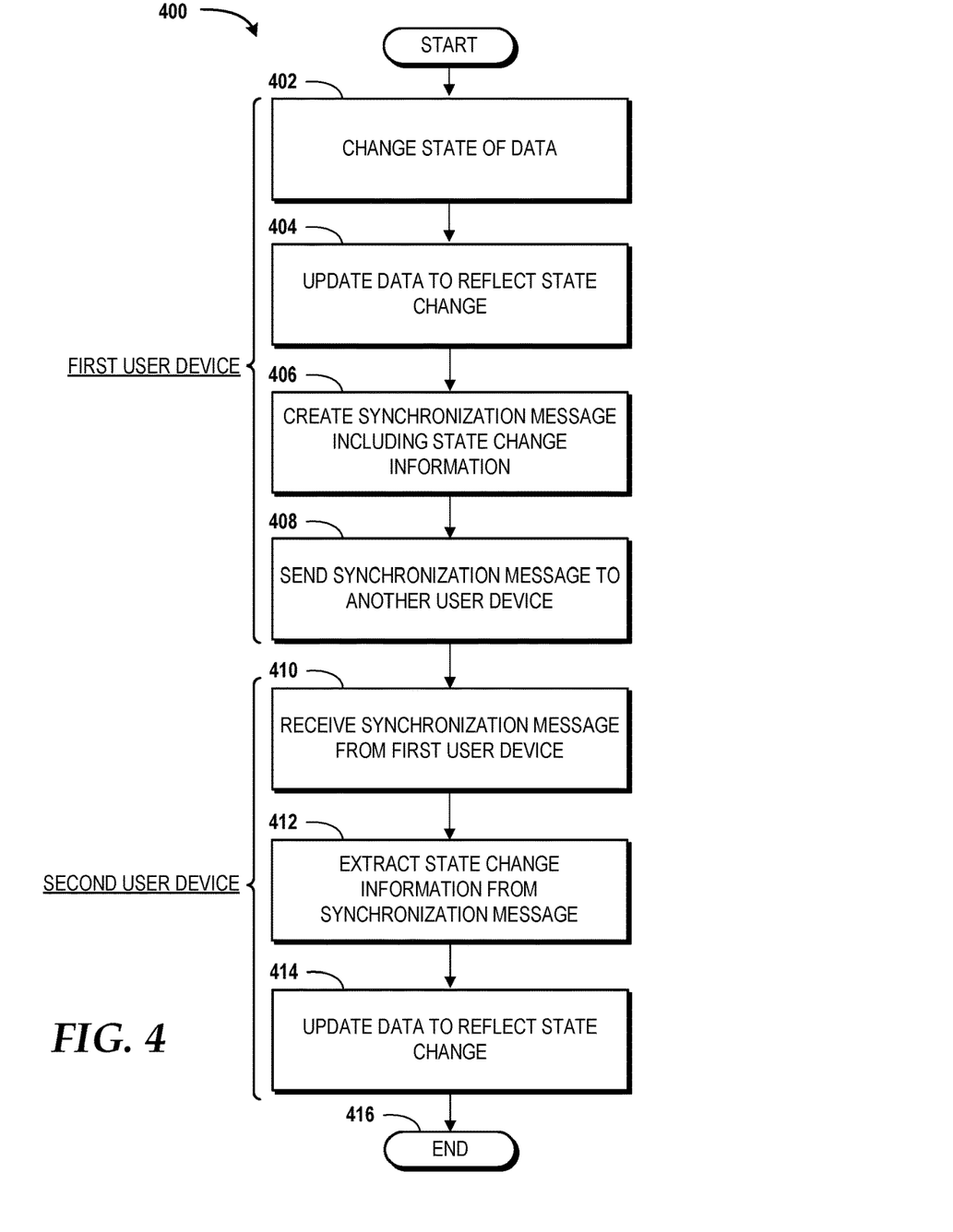
FIG. 4 is a flow diagram showing aspects of a method for synchronizing data utilizing a synchronization message, according to an illustrative embodiment.

Turning now to FIG. 4, a method 400 for synchronizing data utilizing a synchronization message will be described, according to an illustrative embodiment. The method 400 is described below also with reference to FIG. 3. Moreover, operations of the method 400 are described below as being performed by a first user device or a second user device. It should be understood that the same or similar methodology may be used to synchronize data among three or more devices. For purposes of explanation, the first user device is the user device A 104A and the second user device is the user device B 104B.

The method 400 begins and proceeds to operation 402, wherein a first user device, such as the user device A 104A, changes the state of some data via the data application A 112A. In some embodiments, the state change is responsive to data received by the user device A 104A via an input mechanism. For instance, a user of the user device A 104A may input a new message for inclusion in a message exchange. In some embodiments, the state change is responsive to some data received by the user device A 104A from the data server computer 116 via the internet 122 or via the WWAN messaging system A 304A via the WWAN A 302A. In any case, the method 400 proceeds to operation 404, wherein the user device A 104A updates the data to reflect the state change. In doing so, it is assumed that the data stored on the user device A 104A now constitutes unsynchronized data, such as the unsynchronized data A 108A. The data may be considered unsynchronized in part because it is in a state that is different from the state of data stored on a second user device, such as the user device B 104B.

From operation 404, the method 400 proceeds to operation 406, wherein the user device A 104A creates a synchronization message. The synchronization message includes state change information. In some embodiments, the state change information includes an indication that the data has changed in a particular manner. In some embodiments, the state change information includes an indication that all or a portion of the data has been deleted. In some embodiments, the state change information includes an indication that all or a portion of the data has been read. In some embodiments, the state change information includes an indication that all or a portion of the data has been moved from a first file location within a file system of the user device A 104A to a second file location within the file system.

In some embodiments, the state change information includes a message identifier ("message ID") that identifies an order of a particular message in a message flow. For instance, in a group messaging scenario, three or more users may be exchanging messages. If for one reason or another the mobile message flow becomes out of synchronization, such as one or more of the messages in the mobile message flow not being received by a user device involved in the group message, a message ID can be used to identify the order in which the message(s) should have been received. Accordingly, the message ID can be used to recreate the mobile message flow as presented to the user of the user device that did not receive the message(s).

In some embodiments, the state change information includes a user identifier ("user ID") that identifies a user associated with a particular message in a message flow. The user ID may be any other identifier used to identify the user associated with a particular message. In some embodiments, the user ID is a telephone number.

In some embodiments, the synchronization message is an SMS message. In some embodiments, the state change information is stored in the message payload of the SMS message. In some embodiments, the state change information is stored in the subject line of the SMS message. At present, the subject line of SMS messages is rarely, if ever, displayed by the receiving user device. As such, including the state change information in the subject line effectively hides the state change information from the user. In some embodiments, the synchronization message is a hidden SMS message so that a user does not see or otherwise receive any indication of the synchronization message having been received by the user's device.

From operation 406, the method 400 proceeds to operation 408, wherein the user device A 104A sends the synchronization message to the user device B 104B. At operation 410, the user device B 104B receives the synchronization message from the user device A 104A. From operation 410, the method 400 proceeds to operation 412, wherein the user device B 104B extracts the state change information from the synchronization message. In particular, the synchronization application B 112B extracts the state change information from the synchronization message.

From operation 412, the method 400 proceeds to operation 414, wherein the user device B 104B updates the unsynchronized data 108B to reflect the state change identified in the state change information. The method 400 then proceeds to operation 416, wherein the method 400 ends.

In some embodiments, the state change information includes an indication that the unsynchronized data A 108A stored on the user device A 104A has changed in a particular manner, and updating the unsynchronized data B 108B to reflect the state change so that the unsynchronized data A 108A and the unsynchronized data B 108B become the synchronized data A 110A and the synchronized data B 110B, respectively, includes changing the unsynchronized data B 108B in the particular manner so that the unsynchronized data A 108A and the unsynchronized data B 108B become the synchronized data A 110A and the synchronized data B 110B, respectively.

In some embodiments, the unsynchronized data A 108A and the unsynchronized data B 108B each include e-mail message data or mobile message data and the state change information includes an indication that at least a portion of the unsynchronized data A 108A stored on the user device A 104A has been deleted. In these embodiments, updating the unsynchronized data 108B to reflect the state change so that the unsynchronized data A 108A and the unsynchronized data B 108B become the synchronized data A 110A and the synchronized data B 110B, respectively, includes deleting at least the portion of the unsynchronized data B 108B so that the unsynchronized data A 108A and the unsynchronized data B 108B become the synchronized data A 110A and the synchronized data B 110B, respectively.

In some embodiments, the unsynchronized data A 108A and the unsynchronized data B 108B each include an e-mail message and the state change information includes an indication that the e-mail message stored on the user device A 104A has been read. In these embodiments, updating the unsynchronized data B 108B to reflect the state change so that the unsynchronized data A 108A and the unsynchronized data B 108B become the synchronized data A 110A and the synchronized data B 110B, respectively, includes updating the e-mail message stored on the user device B 104B as having been read so that the unsynchronized data A 108A and the unsynchronized data B 108B become the synchronized data A 110A and the synchronized data B 110B, respectively.

In some embodiments, the synchronization message includes a hidden short message service message. In some embodiments, the synchronization message includes a visible short message service message. In any case, the state change information may be included in a payload of the short message service message or in a subject line of the short message service message, as described above.

Figure 5:
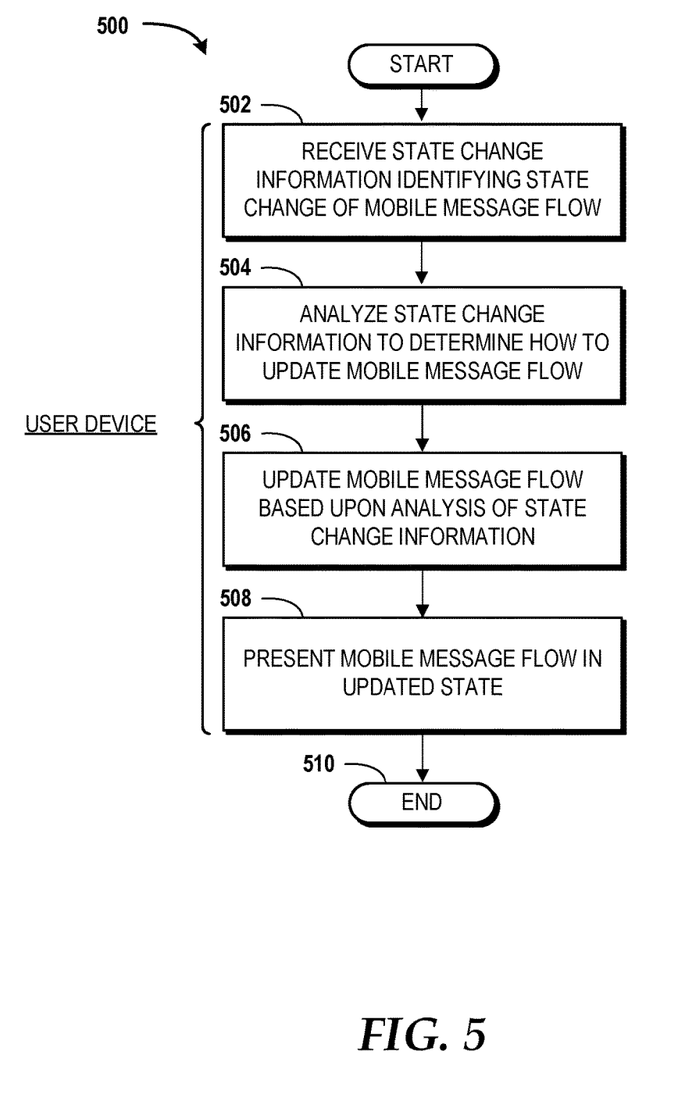
FIG. 5 is a flow diagram showing aspects of a method for updating a message flow, according to an illustrative embodiment.

Turning now to FIG. 5, a method 500 for updating a mobile message flow will be described, according to an illustrative embodiment. The method 500 is described from the perspective of any user device such as the user device A 104A, the user device B 104B, the user device C 104C, or the user device N 104N. The method 500 begins and proceeds to operation 502, wherein the user device receives state change information identifying a state change of the mobile message flow. In some embodiments, the state change information is received via the PAN connection 106 as described above with reference to FIGS. 1 and 2. In other embodiments, the state change information is received via a synchronization message as described above with reference to FIGS. 3 and 4. In any case, the method 500 then proceeds to operation 504.

At operation 504, the user device analyzes the state change information to determine how to update the mobile message flow. For instance, the state change information may indicate that a particular message within the mobile message flow is out of order. In this instance, the user device may determine, based upon an analysis of state change information, that the message needs to be moved into a different position within the mobile message flow. The analysis may be based upon a time at which each message in the mobile message flow was sent, if such information is available. Alternatively, the analysis may be based upon a context of the messages included in the mobile message flow. For instance, if a first message in the mobile message flow states a joke and a subsequent message includes a response to the joke such as laugh out loud ("LOL") or the like, the subsequent message would not be understood outside of the context provided by the joke. As such, the analysis may determine the order of the messages in the mobile message flow based upon contextual information provided by the text of messages contained therein.

From operation 504, the method 500 proceeds to operation 506, wherein the user device updates the mobile message flow based upon the analysis performed at operation 504. The method 500 then proceeds to operation 508, wherein the mobile message flow is presented on the user device in the updated state. For instance, the mobile message flow can be updated to show the proper order of messages according to the updated state. From operation 508, the method 500 proceeds to operation 510, wherein the method 500 ends.

Figure 6:
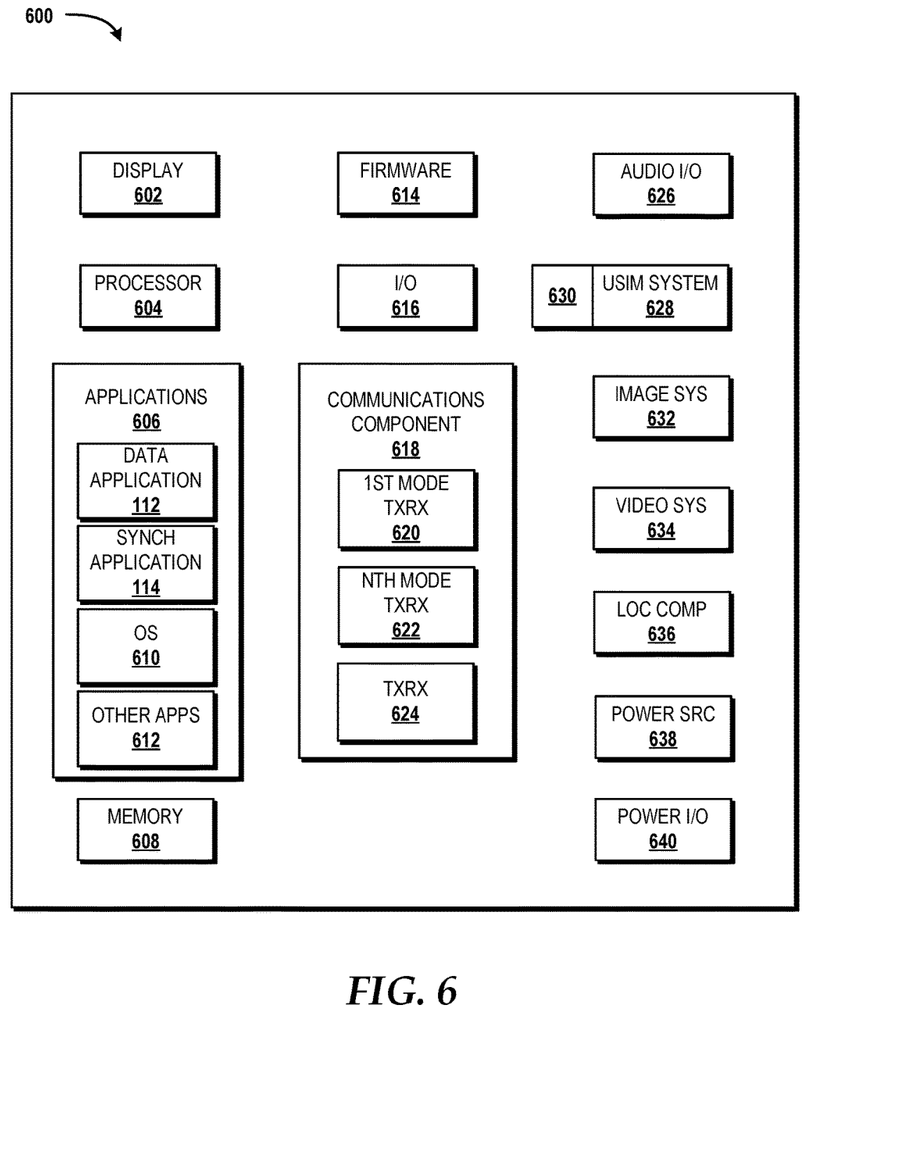
FIG. 6 is a mobile device architecture diagram illustrating an illustrative mobile device hardware and software architecture for a mobile device capable of implementing aspects of the embodiments disclosed herein.

Turning now to FIG. 6, an illustrative mobile device 600 and components thereof will be described. Although connections are not shown between the components illustrated in FIG. 6, the components can interact with each other to carry out device functions. In some embodiments, for example, the components are arranged so as to communicate via one or more busses (not shown). It should be understood that FIG. 6 and the following description are intended to provide a general understanding of a suitable environment in which various aspects of embodiments can be implemented. Any of the user devices described herein above may be configured like the mobile device 600. It should be understood that the mobile device may include additional functionality or include less functionality than now described.

As illustrated in FIG. 6, the mobile device 600 includes a display 602 for visually displaying data including, but not limited to, graphical user interface ("GUI") elements, text, images, video, virtual keypads and/or keyboards, messaging data, notification messages, metadata, internet content, device status, time, date, calendar data, device preferences, map and location data, and the like. The mobile device 600 also includes a processor 604 for processing data and/or executing computer-executable instructions of one or more applications 606 stored in a memory 608.

In the illustrated embodiment, the applications 606 include the data application 112, the synchronization application 114, an operating system ("OS") application 610, and other applications 612. In some embodiments, the OS application 610 is one of SYMBIAN OS from SYMBIAN LIMITED, WINDOWS MOBILE OS from MICROSOFT CORPORATION, WINDOWS PHONE OS from MICROSOFT CORPORATION, PALM WEBOS from HEWLETT PACKARD CORPORATION, BLACKBERRY OS from RESEARCH IN MOTION LIMITED, IOS from APPLE INC., and ANDROID OS from GOOGLE INC. These operating systems are merely illustrative of the operating systems that may be used in accordance with the embodiments disclosed herein.

In some embodiments, the other applications 612 include, for example, visual voicemail applications, messaging applications, text-to-speech and speech-to-text applications, add-ons, plug-ins, e-mail applications, music applications, video applications, camera applications, location-based service applications, navigation applications, power conservation applications, game applications, productivity applications, entertainment applications, enterprise applications, combinations thereof, and the like. The applications 606 or portions thereof are stored in the memory 608 and/or in a firmware 614, and are executed by the processor 604. The firmware 614 may also store code for execution during device power up and power down operations. In some embodiments, the OS 610 or a portion thereof, such as a kernel, is stored in the firmware 614.

The mobile device 600 also includes an input/output ("I/O") interface 616 for the input/output of data such as location information, presence status information, user IDs, passwords, application initiation (start-up) requests, and other input/output of data associated with the embodiments disclosed herein. In some embodiments, the I/O interface 616 is a hardwire connection such as a universal serial bus ("USB"), mini-USB, micro-USB, audio jack, PS2, IEEE 1394, serial, parallel, Ethernet (RJ411) port, RJ11 port, proprietary port, combinations thereof, or the like. In some embodiments, the mobile device 600 is configured to synchronize with another device (e.g., a computer) to transfer content stored to/from the mobile device 600. In some embodiments, the mobile device 600 is configured to receive updates to one or more of the applications 606 via the I/O interface 616. In some embodiments, the I/O interface 616 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 616 may be used for communications between the mobile device 600 and a network device or local device instead of, or in addition to, a communications component 618.

The communications component 618 interfaces with the processor 604 to facilitate wireless communications with one or more networks, such as the LAN 118, the WWAN 120, the WWAN A 302A, and/or the WWAN B 302B. In some embodiments, the one or more networks include networks that utilize a mobile wireless technology. In some embodiments, one or more networks include networks that utilize non-cellular wireless technologies such as WI-FI or WIMAX. In some embodiments, the communications component 618 includes a multimode communications subsystem for facilitating communications via a cellular network and one or more WI-FI, WIMAX or other non-cellular wireless network.

The communications component 618, in some embodiments, includes one or more transceivers each configured to communicate over the same or a different wireless technology standard. For example, the transceivers of the communications component 618 may be configured to communicate using GSM, CDMAONE, CDMA2000, LTE, and various other 2G, 3G, 4G, and greater generation technology standards. Moreover, the communications component 618 may facilitate communications over various channel access methods (which may or may not be used by the aforementioned standards) including, but not limited to, TDMA, FDMA, W-CDMA, OFDM, SDMA, and the like. In addition, the communications component 618 may facilitate data communications using GPRS, EDGE, the HSPA protocol family including HSDPA, EUL or otherwise termed HSUPA, HSPA+, and various other current and future wireless data access standards.

In the illustrated embodiment, the communications component 618 includes a first cellular transceiver 620 that operates in one mode (e.g., GSM), and an $N^{th}$ cellular transceiver 622 operates in a different mode (e.g., UMTS). While only two cellular transceivers 620, 622 are illustrated, it should be appreciated that more than two transceivers can be included in the communications component 618.

The illustrated communications component 618 also includes an alternative communications transceiver 624 for use by other communications technologies including WI-FI, WIMAX, BLUETOOTH, infrared, IRDA, NFC, other RF, combinations thereof, and the like, such as to facilitate the PAN 102 and establishment of the PAN connection 106 shown in FIG. 1. In some embodiments, the communications component 618 also facilitates reception from terrestrial radio networks, digital satellite radio networks, internet-based radio service networks, combinations thereof, and the like.

In some embodiments, the communications component 618 processes data from a network such as an internet, the Internet, an intranet, a home broadband network, a WI-FI hotspot, and the like, via an internet service provider ("ISP"), digital subscriber line ("DSL") provider, or broadband provider.

Audio capabilities for the mobile device 600 may be provided by an audio I/O component 626 that includes a speaker for the output of audio signals and a microphone to collect audio signals.

The illustrated mobile device 600 also includes a universal subscriber identity module ("USIM") system 628 that includes a SIM slot interface 630 for accommodating a USIM card. In some embodiments, the USIM system 628 is configured to accept insertion of other SIM cards for access to other network types such as GSM. In other embodiments, the USIM system 628 is configured to accept multiple SIM cards. In still other embodiments, the USIM system 628 is configured to accept a universal integrated circuit card ("UICC") with one or more SIM applications stored thereupon.

The mobile device 600 may also include an image capture and processing system 632 ("image system"). Photos may be obtained via an associated image capture subsystem of the image system 632, for example, a camera. The mobile device 600 may also include a video system 634 for capturing, processing, recording, and/or modifying video content. Photos and videos obtained using the image system 632 and the video system 634, respectively, may be added as message content to a MMS message and sent to another mobile device.

The illustrated mobile device 600 also includes a location component 636 for sending and/or receiving signals such as global positioning system ("GPS") data, assisted-GPS data, WI-FI/WIMAX and/or cellular network triangulation data, combinations thereof, and the like, for determining a location of the mobile device 600. The location component 636 may communicate with the communications component 618 to retrieve triangulation data for determining a location of the mobile device 600. In some embodiments, the location component 636 interfaces with cellular network nodes, telephone lines, satellites, location transmitters and/or beacons, wireless network transmitters and receivers, combinations thereof, and the like. In some embodiments, the location component 636 includes one or more sensors such as a compass, an accelerometer, and/or a gyroscope to determine the orientation of the mobile device 600. Using the location component 636, the mobile device 600 can generate and/or receive data to identify its location, or transmit data used by other devices to determine the location of the mobile device 600. The location component 636 may include multiple components for determining the location and/or orientation of the mobile device 600.

The illustrated mobile device 600 also includes a power source 638, such as one or more batteries and/or other power subsystem (AC or DC). The power source 638 may interface with an external power system or charging equipment via a power I/O component 640.

Figure 7:
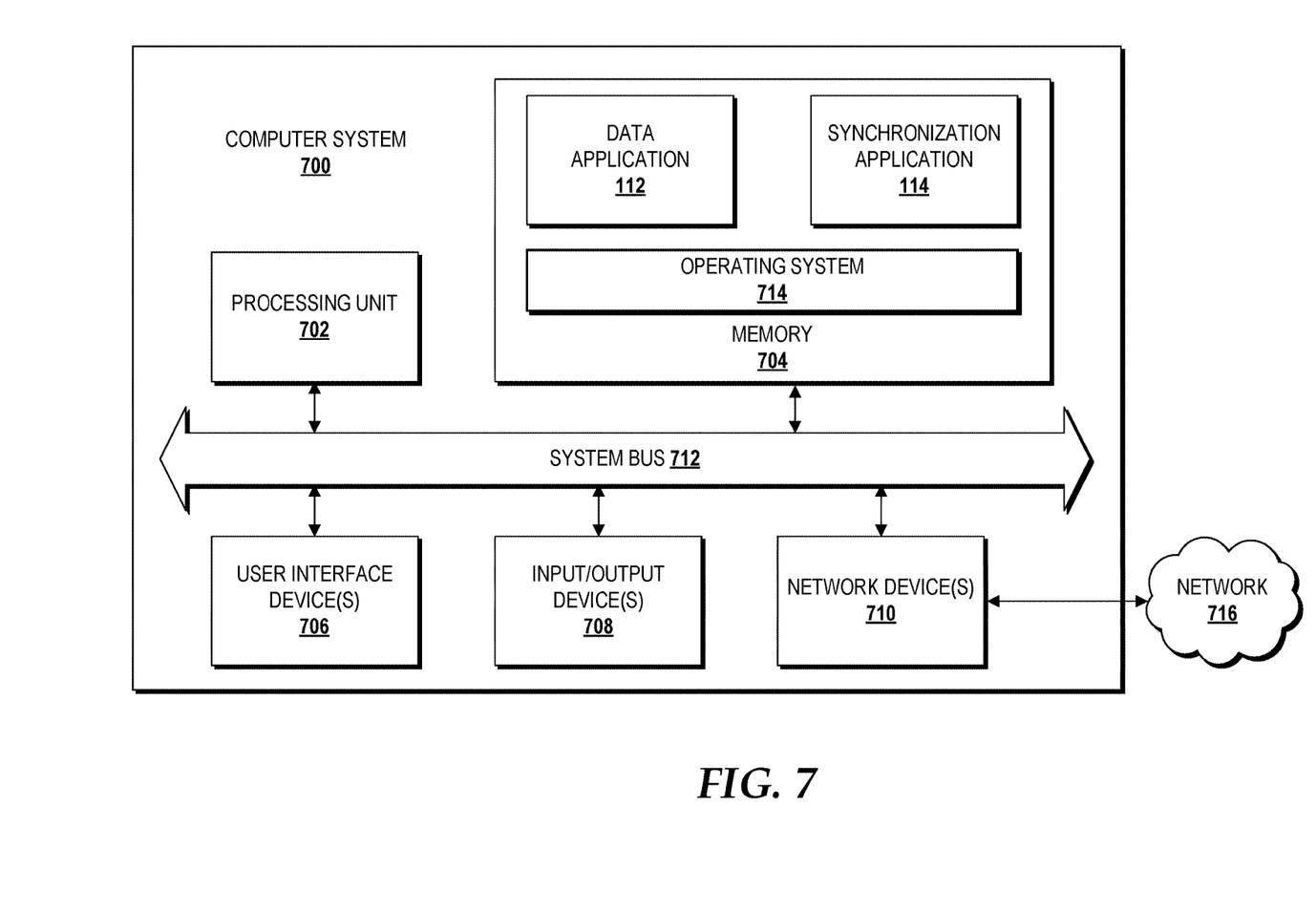
FIG. 7 is a computer architecture diagram illustrating an illustrative computer hardware and software architecture for a computing system capable of implementing aspects of the embodiments presented herein.

FIG. 7 is a block diagram illustrating a computer system 700 configured to perform various operations disclosed herein. The user device A 104A, the user device B 104B, the user device C 104C, the user device N 104N, and/or the data server computer 116 may be configured like the computer system 700. The computer system 700 includes the data application 112 and the synchronization application 114. It should be understood, however, that implementations of the data server computer 116 that utilize the architecture disclosed in FIG. 7 would not include the data application 112 and the synchronization application 114.

The computer system 700 includes a processing unit 702, a memory 704, one or more user interface devices 706, one or more input/output ("I/O") devices 708, and one or more network devices 710, each of which is operatively connected to a system bus 712. The bus 712 enables bi-directional communication between the processing unit 702, the memory 704, the user interface devices 706, the I/O devices 708, and the network devices 710.

The processing unit 702 may be a standard central processor that performs arithmetic and logical operations, a more specific purpose programmable logic controller ("PLC"), a programmable gate array, or other type of processor known to those skilled in the art and suitable for controlling the operation of the computer system 700. Processing units are generally known, and therefore are not described in further detail herein.

The memory 704 communicates with the processing unit 702 via the system bus 712. In some embodiments, the memory 704 is operatively connected to a memory controller (not shown) that enables communication with the processing unit 702 via the system bus 712. The illustrated memory 704 includes an operating system 714, the data application 112, and the synchronization application 114.

The operating system 714 can include, but is not limited to, members of the WINDOWS, WINDOWS CE, WINDOWS MOBILE, and/or WINDOWS PHONE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS and/or iOS families of operating systems from APPLE INC., the FREEBSD family of operating systems, the SOLARIS family of operating systems from ORACLE CORPORATION, other operating systems such as proprietary operating systems, and the like.

The user interface devices 706 may include one or more devices with which a user accesses the computer system 700. The user interface devices 706 may include, but are not limited to, computers, servers, personal digital assistants, telephones (e.g., cellular, IP, or landline), or any suitable computing devices. The I/O devices 708 enable a user to interface with the program modules. In one embodiment, the I/O devices 708 are operatively connected to an I/O controller (not shown) that enables communication with the processing unit 702 via the system bus 712. The I/O devices 708 may include one or more input devices, such as, but not limited to, a keyboard, a mouse, or an electronic stylus. Further, the I/O devices 708 may include one or more output devices, such as, but not limited to, a display screen or a printer.

The network devices 710 enable the computer system 700 to communicate with other networks or remote systems via a network 716, such the network 118 described herein above. Examples of the network devices 710 include, but are not limited to, a modem, a radio frequency ("RF") or infrared ("IR") transceiver, a telephonic interface, a bridge, a router, or a network card. The network 716 may be any of the networks described herein. More generally, the network 716 may include a wireless network such as, but not limited to, a WLAN such as a WI-FI network, a WWAN, a WPAN, or a wireless metropolitan area network ("WMAN"). Alternatively, the network 716 may be a wired network such as, but not limited to, a WAN) such as the Internet, a LAN such as the Ethernet, a PAN, or a wired metropolitan area network ("MAN").

The network 716 embodied as a cellular network may utilize a mobile telecommunications technology such as, but not limited to, GSM, UMTS, CDMA ONE, CDMA2000, LTE, and various other 2G, 3G, 4G, and greater generation mobile telecommunications technologies. In addition, mobile data communications technologies such as GPRS, EDGE, the HSPA protocol family including HSDPA, EUL or otherwise termed HSUPA, HSPA+, and various other current and future mobile data communications technologies are contemplated for use by the network 716. Therefore, the embodiments presented herein should not be construed as being limited to a particular mobile telecommunications technology and/or standards utilizing such technologies.

As used herein, communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared, and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules, or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by a user device or computer system, such as one of the user device 104 and/or the data server computer 116 described herein above. For purposes of the claims, the phrase "computer storage medium" and variations thereof, does not include waves, signals, and/or other transitory and/or intangible communication media, per se.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

Based on the foregoing, it should be appreciated that technologies for point-to-point data synchronization have been disclosed herein. Although the subject matter presented herein has been described in language specific to computer structural features, methodological and transformative acts, specific computing machinery, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A computer storage medium storing instructions that, when executed by a processor of a first user device, cause the processor of the first user device to perform operations comprising:
    establishing a personal area network connection with a second user device that is located within a personal area network with the first user device, wherein the first user device and the second user device are located within the personal area network when the first user device and the second user device are within physical proximity of one another;
    receiving, via the personal area network connection, a short message service message from the second user device, wherein the short message service message from the second user device comprises state change information identifying data that was received, via a network different from the personal area network, by the second user device from an external source located outside of the personal area network but that was not received by the first user device prior to establishment of the personal area network connection between the first user device and the second user device;
    in response to receiving the short message service message from the second user device via the personal area network connection comprising state change information identifying the data not received by the first user device prior to establishment of the personal area network connection between the first user device and the second user device, synchronizing the first user device to include the data from the second user device;
    after synchronizing the first user device to include the data from the second user device, receiving the data from the external source via the network different from the personal area network; and
    in response to receiving the data from the external source after synchronizing the first user device to include the data from the second user device, deleting the data received from the external source since the data was already received by the first user device from the second user device.

2. The computer storage medium of claim 1, wherein the external source comprises an e-mail server and the data comprises an e-mail message from the e-mail server that was received by the second user device from the e-mail server but was not received by the first user device from the e-mail server prior to the personal area network connection being established between the first user device and the second user device.

3. The computer storage medium of claim 1, wherein the external source comprises a mobile message service center and the data comprises a mobile message generated by the second user device directed to at least the first user device that was not received by the first user device from the mobile message service center serving the first user device prior to the personal area network connection being established between the first user device and the second user device.

4. The computer storage medium of claim 3, wherein the state change information comprises an order of the mobile message within a message flow comprising a plurality of mobile messages.

5. The computer storage medium of claim 1, wherein the network different from the personal area network is a mobile telecommunications network.

6. The computer storage medium of claim 1, wherein the first user device and the second user device are both associated with a single user.

7. The computer storage medium of claim 1, wherein the first user device is associated with a first user and the second user device is associated with a second user.

8. A first user device comprising:
    a processor; and
    a memory storing instructions that, when executed by the processor, cause the first user device to perform operations comprising
        establishing a personal area network connection with a second user device that is located within a personal area network with the first user device, wherein the first user device and the second user device are located within the personal area network when the first user device and the second user device are within physical proximity of one another,
        receiving, via the personal area network connection, a short message service message from the second user device, wherein the short message service message from the second user device comprises state change information identifying data that was received, via a network different from the personal area network, by the second user device from an external source located outside of the personal area network but that was not received by the first user device prior to establishment of the personal area network connection between the first user device and the second user device,
        in response to receiving the short message service message from the second user device via the personal area network connection comprising state change information identifying the data not received by the first user device prior to establishment of the personal area network connection between the first user device and the second user device, synchronizing the first user device to include the data from the second user device,
        after synchronizing the first user device to include the data from the second user device, receiving the data from the external source via the network different from the personal area network, and
        in response to receiving the data from the external source after synchronizing the first user device to include the data from the second user device, deleting the data received from the external source since the data was already received by the first user device from the second user device.

9. The first user device of claim 8, wherein the external source comprises an e-mail server and the data comprises an e-mail message from the e-mail server that was received by the second user device from the e-mail server but was not received by the first user device from the e-mail server prior to the personal area network connection being established between the first user device and the second user device.

10. The first user device of claim 8, wherein the external source comprises a mobile message service center and the data comprises a mobile message generated by the second user device directed to at least the first user device that was not received by the first user device from the mobile message service center serving the first user device prior to the personal area network connection being established between the first user device and the second user device.

11. The first user device claim 10, wherein the state change information comprises an order of the mobile message within a message flow comprising a plurality of mobile messages.

12. The first user device of claim 8, wherein the network different from the personal area network is a mobile telecommunications network.

13. The first user device of claim 8, wherein the first user device and the second user device are both associated with a single user.

14. The first user device of claim 8, wherein the first user device is associated with a first user and the second user device is associated with a second user.

15. A method comprising:
- establishing, by a first user device, a personal area network connection with a second user device that is located within a personal area network with the first user device, wherein the first user device and the second user device are located within the personal area network when the first user device and the second user device are within physical proximity of one another;
- receiving, at the first user device, via the personal area network connection, a short message service message from the second user device, wherein the short message service message from the second user device comprises state change information identifying data that was received, via a network different from the personal area network, by the second user device from an external source located outside of the personal area network but that was not received by the first user device prior to establishment of the personal area network connection between the first user device and the second user device;
- in response to receiving the short message service message from the second user device via the personal area network connection comprising state change information identifying the data not received by the first user device prior to establishment of the personal area network connection between the first user device and the second user device, synchronizing, by the first user device, the first user device to include the data from the second user device;
- after synchronizing the first user device to include the data from the second user device, receiving, at the first user device, the data from the external source via the network different from the personal area network; and
- in response to receiving the data from the external source after synchronizing the first user device to include the data from the second user device, deleting, by the first user device, the data received from the external source since the data was already received by the first user device from the second user device.

16. The method of claim 15, wherein the external source comprises an e-mail server and the data comprises an e-mail message from the e-mail server that was received by the second user device from the e-mail server but was not received by the first user device from the e-mail server prior to the personal area network connection being established between the first user device and the second user device.

17. The method of claim 15, wherein the external source comprises a mobile message service center and the data comprises a mobile message generated by the second user device directed to at least the first user device that was not received by the first user device from the mobile message service center serving the first user device prior to the personal area network connection being established between the first user device and the second user device.

18. The method of claim 17, wherein the state change information comprises an order of the mobile message within a message flow comprising a plurality of mobile messages.

19. The method of claim 15, wherein the network different from the personal area network is a mobile telecommunications network.

20. The method of claim 15, wherein the first user device and the second user device are both associated with a single user.

* * * * *